(12) United States Patent
Georgeson et al.

(10) Patent No.: US 8,047,749 B2
(45) Date of Patent: Nov. 1, 2011

(54) RAPID INSPECTION OF LIGHTNING STRIKE PROTECTION SYSTEMS PRIOR TO INSTALLING FASTENER

(75) Inventors: Gary E. Georgeson, Federal Way, WA (US); James H. Lee, Ravensdale, WA (US); Scott W. Lea, Renton, WA (US); Morteza Safai, Seattle, WA (US)

(73) Assignee: The Boeing Company, Chicago, IL (US)

( * ) Notice: Subject to any disclaimer, the term of this patent is extended or adjusted under 35 U.S.C. 154(b) by 1097 days.

(21) Appl. No.: 11/847,555

(22) Filed: Aug. 30, 2007

(65) Prior Publication Data
US 2009/0060666 A1    Mar. 5, 2009

(51) Int. Cl.
*B23B 49/00* (2006.01)
(52) U.S. Cl. ............... 408/1 R; 406/12; 406/16; 33/833
(58) Field of Classification Search .......... 408/1 R, 408/8, 10, 12, 16; 72/17.3; 83/358, 360; 226/10; 33/832–834; *B23B 49/00*
See application file for complete search history.

(56) References Cited

U.S. PATENT DOCUMENTS

| | | | | |
|---|---|---|---|---|
| 3,973,859 A | * | 8/1976 | Huber et al. | 408/12 |
| 4,198,180 A | * | 4/1980 | Schultz | 408/9 |
| 4,644,335 A | * | 2/1987 | Wen | 340/683 |
| 4,765,784 A | * | 8/1988 | Karwan | 408/13 |
| 4,818,154 A | * | 4/1989 | Bye et al. | 408/111 |
| 4,968,146 A | * | 11/1990 | Heizmann et al. | 356/623 |
| 5,040,309 A | * | 8/1991 | Hayden et al. | 33/833 |
| 5,161,922 A | * | 11/1992 | Malloy | 408/14 |
| 5,175,532 A | * | 12/1992 | Wojciechowski et al. | 340/686.4 |
| 5,819,202 A | * | 10/1998 | Sato et al. | 702/33 |
| 6,015,249 A | * | 1/2000 | Sacchetti | 409/186 |
| 6,158,929 A | * | 12/2000 | Fisher | 408/1 R |
| 6,587,184 B2 | * | 7/2003 | Wursch et al. | 356/4.01 |
| 7,096,555 B2 | * | 8/2006 | Tourne et al. | 29/402.06 |

* cited by examiner

*Primary Examiner* — Eric A Gates
(74) *Attorney, Agent, or Firm* — Caven & Aghevli LLC

(57) ABSTRACT

Methods and systems are disclosed for drilling counter sink fastener holes in composite materials with conductive foil lightning strike protection systems. Initially a non-destructive depth detector is scanned over a prospective fastener hole location. Then the depth of a conductive foil below a surface is detected. When the detected depth is less than a predetermined depth, a signal that indicates that a countersink fastener hole may be drilled is output. When the detected depth is greater than a predetermined depth, a signal that indicates that a countersink fastener hole may not be drilled is output.

20 Claims, 9 Drawing Sheets

"RELATED ART"

RAPID INSPECTION OF LIGHTNING STRIKE PROTECTION SYSTEMS PRIOR TO INSTALLING FASTENER

BACKGROUND

1. Field of the Disclosure

The disclosure relates to systems and methods for inspecting lightning protection systems and, more particularly, to systems and methods for inspecting lighting protection systems prior to the fastener installation process.

2. Description of the Related Art

Today's aircraft are being designed and built with greater percentages of composite material. For example, the Boeing 787 "Dreamliner" aircraft has more than 50% composites for its primary structure. Although composites are lighter and have better mechanical and fatigue properties than traditional aluminum, they are less electrically conductive, and have poor electromagnetic shielding, resulting in poor current dissipation when lightning strikes the aircraft. Compared to traditional aluminum, composites, in some circumstances, may be subject to greater damage due to lightning strikes.

When lightning hits an aircraft, a conductive path on its skin allows the electricity to travel along the skin, and then exit at some other location. Without an adequate conductive path, arcing and hot spots may occur. Arcing and hot spots have the potential to char, delaminate and/or penetrate the skin. In some circumstances, the charring, delamination, or skin penetration may reduce the load-bearing characteristics of the structure. The low electrical shielding capability of composite materials may increase the likelihood that electrical circuits will be affected by the lightning strike.

One way to protect composite skins from lightning strike damage is to include conductive Lightning Strike Protection (LSP) systems either in or on the composite skins of an aircraft. An example of an LSP system is shown in FIG. 1. The LSP system can consist of conductive (e.g., copper) sheets or foils 110 on the layer of composite material 120 nearest the aero surface. Fasteners 140 in aircraft structures require that a countersunk hole 130 be drilled into the composite surface. Current practice is to position the fastener head 142 deeper into its countersunk area to ensure that a minimum distance can be established between the conductive foil 110 and the fastener head 142.

This Lightning Strike Protection system functions by diverting the electrical energy through the conductive foil 110. The conductive foil (nearer the surface) attracts lightning away from the fastener heads 142 which are slightly lower. Maintaining the set minimum distance between the conductive foil 110 and the fastener head 142 reduces the chance of arcing. Dielectric sealant may also be placed on top of the fastener head 142 to prevent arcing from the foil 110 to the fastener 140.

As illustrated in FIGS. 2A and 2B (The cross section of FIG. 2B is perpendicular to the cross section of FIG. 2A) and shown in FIG. 3, wrinkles in the conductive foil 110 may occur due to thermal conditions during the composite curing process. When heated, conductive foils 110 tend to expand more than the composite materials, due to differences in coefficient of thermal expansion (CTE). For example, copper expands much more than graphite fiber. When heated to the standard cure temperature of 350° F., the conductive foil 110 expands relative to the composite materials 120. Since the foil 110 is restrained lengthwise, wrinkling can result. These wrinkles are then locked in place upon curing of the composites, and, when cooled, the wrinkles remain. These wrinkles cause the conductive foil to extend in depth below the designed level. In the wrinkles illustrated in FIGS. 2A and 2B the wrinkle depth is below the top of the fastener head 142.

These wrinkles increase the likelihood of arcing occurring between the fastener 142 and the conductive foil 110 when the aircraft is in service. When a fastener hole 130 is drilled into a composite panel where a wrinkle in the LSP exists, the resulting hole and LSP may require repair or some other action to maintain the minimum distance between the LSP and the fastener. The repair may result in substantial expense and an increase in production time.

Accordingly, there is a need for a system and method for inspecting the lightning protection system prior to fastener installation to ensure that there will be minimum gap between the conductive foil and the fastener head when the fastener is installed.

SUMMARY

The present disclosure addresses the problems identified above by providing methods, equipment, and systems that can determine the depth of the conductive foil below the surface of a part.

Methods and systems are disclosed for drilling counter sink fastener holes in composites with conductive foil lightning strike protection systems. Initially a non-destructive depth detector is scanned over a prospective fastener hole location. Then the depth of a conductive foil below a surface is detected. When the detected depth is less than a predetermined depth, a signal that indicates that a countersink fastener hole may be drilled is output. When the detected depth is greater than a predetermined depth, a signal that indicates that a countersink fastener hole may not be drilled is output.

One embodiment provides a method of drilling a fastener hole. Initially, a non-destructive depth detector is scanned over a prospective fastener hole location. A depth of a conductive foil is detected below a surface. When the detected depth is less than a predetermined depth, a signal that indicates that a countersink fastener hole may be drilled is output. When the detected depth is greater than a predetermined depth, a signal that indicates that a countersink fastener hole may not be drilled is output.

Another embodiment provides a system for drilling countersink fastener holes in composites containing conductive foils. The system includes a sensor, a signaling device, and a processor. The processor receives output, of the sensor, and based on the received sensor output determines the depth of the conductive foil. Thereafter the processor may output a first signal to the signaling device when the depth of the conductive foil is less than a first predetermined depth or outputs a second signal to the signaling device when the depth of the conductive foil is greater than a second predetermined depth.

The features, functions, and advantages that have been discussed can be achieved independently in various embodiments of the present invention or may be combined in yet other embodiments, further details of which can be seen with reference to the following description and drawings.

BRIEF DESCRIPTION OF THE DRAWINGS

The accompanying drawings incorporated in and forming part of the specification illustrate several aspects of the present disclosure. In the drawings.

Reference will now be made in detail to the present preferred embodiment, examples of which are illustrated in the accompanying drawings.

DETAILED DESCRIPTION OF THE INVENTION

This disclosure describes systems and methods for detecting a depth of a lightning strike protection (LSP) conductive foil within a composite material, that may be used to detect, for example, unacceptably deep wrinkles in the LSP conductive foil prior to drilling fastener countersink holes. If an unacceptably deep wrinkle is found, the fastener's position can be relocated and the fastener countersink hole drilled in an area where a deep wrinkle does not exist. Relocation is often possible because the wrinkles are typically very localized. Thus, minor dimensional changes can often avoid the wrinkle location. If relocation is not possible, another approach to compensate for a wrinkle in a fastener hole site would be to drill the countersink hole slightly deeper so that the desired minimum distance between the conductive foil and the fastener could be maintained.

To relocate the fastener countersink hole, the operator or drilling machine would need to know that a wrinkle was present and locations that would be acceptable to drill the fastener countersink hole. If the countersink hole is to be drilled deeper, the operator or drilling machine would need to know how much deeper to drill the countersink.

Figure 1:
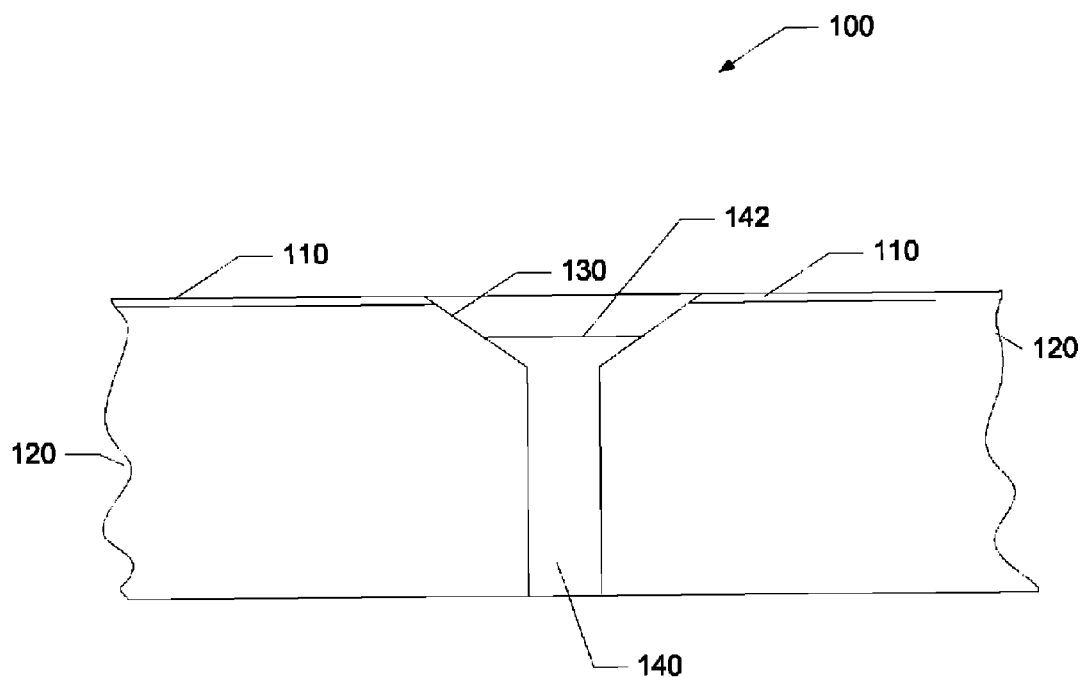
FIG. 1 illustrates a cross section of a fastener installed through an exemplary Lightning Strike Protection system in accordance with the related art.
Figure 2A:
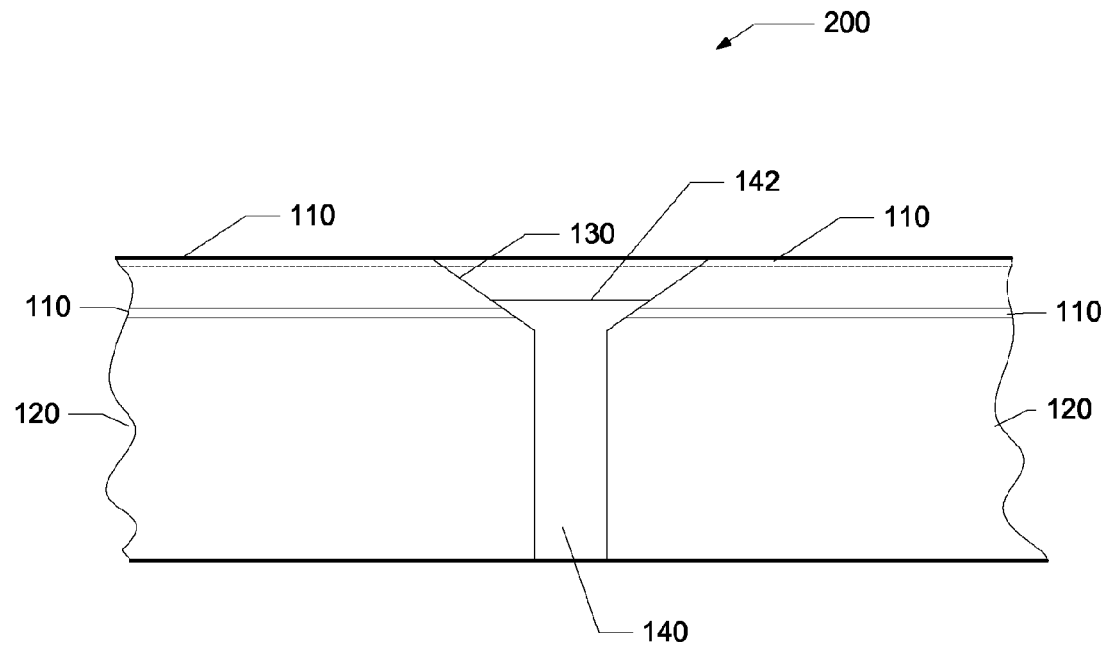
FIGS. 2A and 2B illustrate cross sections of a fastener installed through an exemplary Lightning Strike Protection system where there is a wrinkle in the conductive foil in accordance with the related art. The cross section of FIG. 2B is perpendicular to the cross section of FIG. 2A.
Figure 2B:
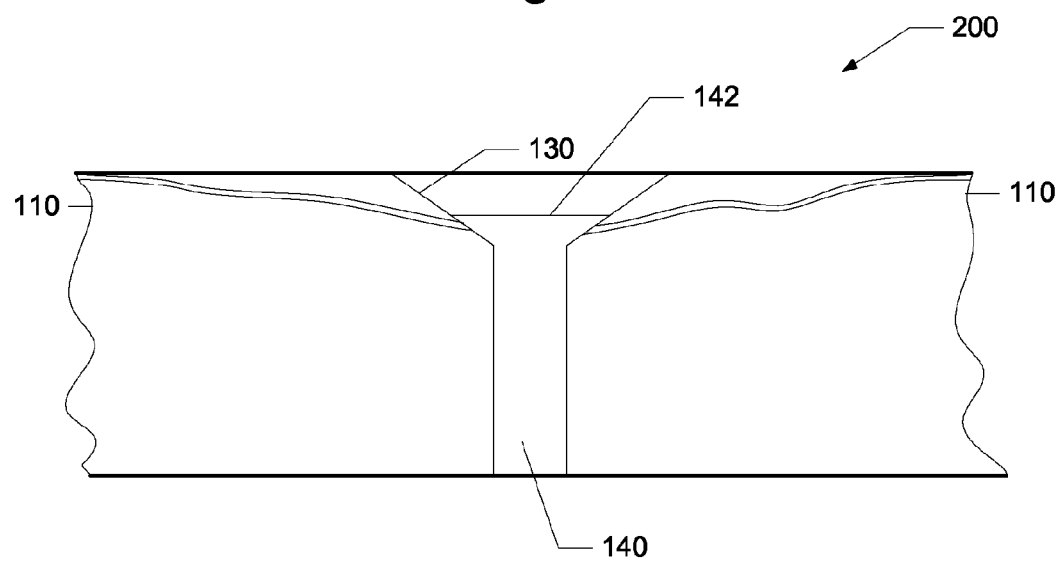
Figure 3:
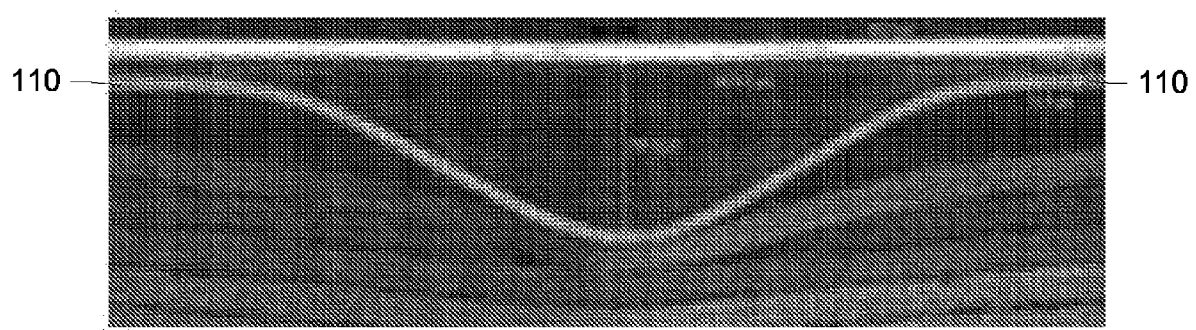
FIG. 3 is a cross-sectional micrograph showing a wrinkle in the conductive foil over the top of composite plies in accordance with the related art.
Figure 4:
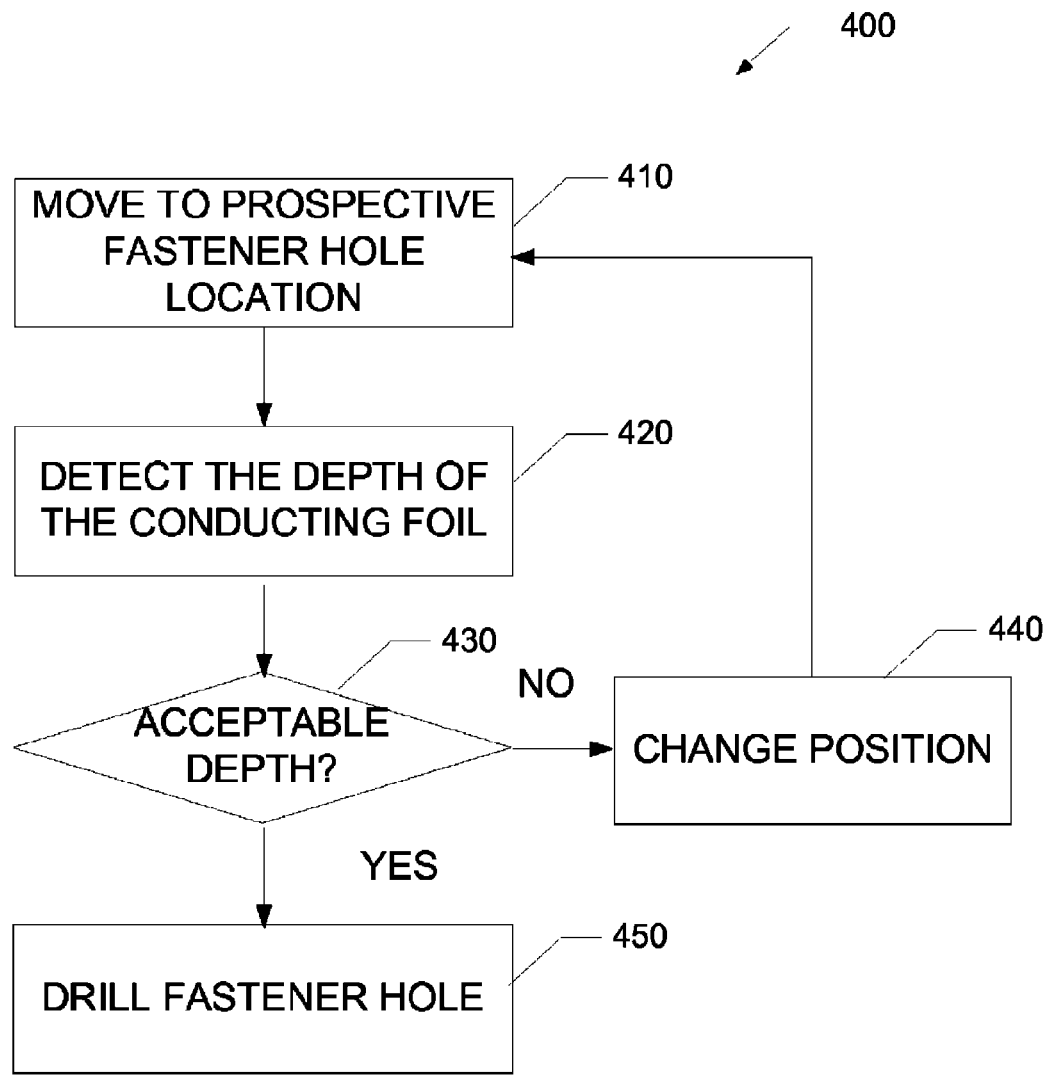
FIG. 4 illustrates an exemplary process flow chart for one embodiment in accordance with the teachings of the present disclosure.

One embodiment of the disclosed inspection process may use the process 400 illustrated in FIG. 4. At block 410 a sensor (e.g., sensor 610 shown in FIG. 6) is moved to a prospective fastener countersink hole location. The sensor may be manually moved or positioned by an operator by hand or using a controller (e.g., joystick) for a remote positioning system. A machine may also position the sensor automatically.

In block 420 the depth of the conducting foil at the location of prospective fastener countersink hole is detected. Thereafter, the detected depth is compared to a predetermined acceptable depth for the conductive foil in block 430. If the detected depth of the conductive foil is less than the acceptable depth, then a drill fastener countersink hole signal can be output in block 450. This signal may be an electric signal to a display or to an automatic drilling machine. The signal could also be a visual or audible signal to the operator. For example, a green light or LED could light if the conductive foil depth was less than the acceptable depth.

When the detected depth of the conductive foil is larger than the acceptable depth, then a change position signal can be output in block 440. This signal may also be an electric signal to a display or to an automatic drilling machine. The signal could also be a visual or audible signal to the operator. For example, a red light or LED could light when the conductive foil was too deep or the foil depth was larger than the acceptable depth. Thereafter the process would return to block 410.

Figure 5:
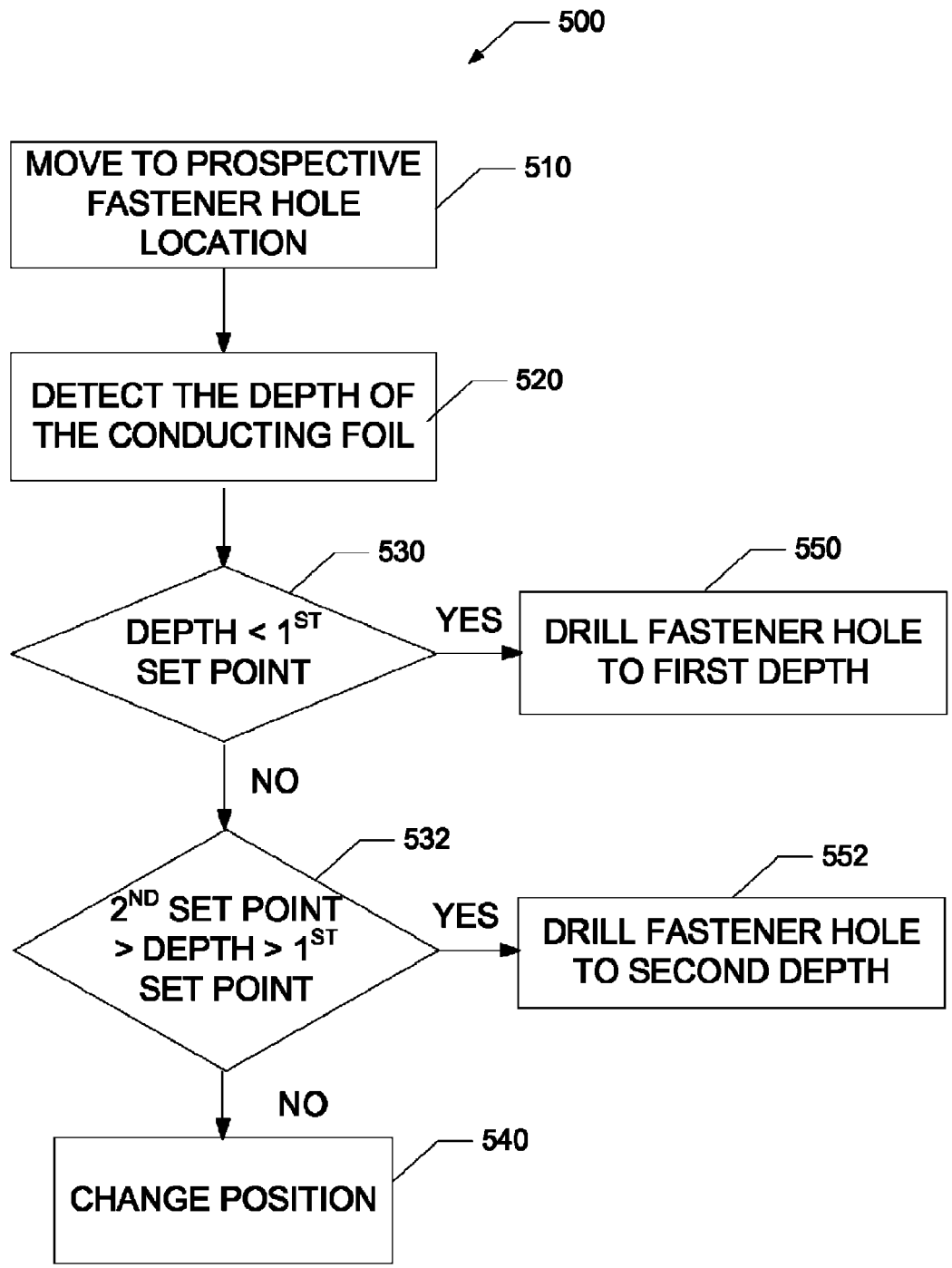
FIG. 5 illustrates an exemplary process flow chart for a second embodiment in accordance with the teachings of the present disclosure.

A second embodiment of the disclosed inspection process may use the process 500 illustrated in FIG. 5. At block 510 a sensor (e.g., sensor 610 shown in FIG. 6) is moved to a prospective fastener countersink hole location. The sensor may be manually moved or positioned by an operator by hand or using a controller (e.g., joystick) for a remote positioning system. A machine may also position the sensor automatically.

In block 520 the depth of the conducting foil at the location of a prospective fastener countersink hole is detected. Thereafter, in block 530, the detected depth is compared to a first predetermined acceptable depth for the conductive foil. If the detected depth of the conductive foil is less than the first predetermined acceptable depth, then a signal can be output in block 550 that causes the fastener countersink hole to be drilled to a first or standard depth. This signal may be an electric signal to a display or to an automatic drilling machine. The signal could also be a visual or audible signal to the operator. For example, a green light or LED could light if the conductive foil depth was less than the first predetermined acceptable depth.

When the detected depth of the conductive foil is larger than the first predetermined acceptable depth, then the process moves to block 532. In block 532 the detected depth is compared to a second predetermined depth for the conductive foil. If the detected depth of the conductive foil is less than the second predetermined acceptable depth, then a drill fastener countersink hole to a second or deep depth signal can be output in block 552. This signal may be an electric signal to a display or to an automatic drilling machine. The signal could also be a visual or audible signal to the operator. For example, a yellow light or LED could light if the conductive foil depth was larger than the first predetermined acceptable depth but less than the second predetermined acceptable depth.

In some embodiments the signal output may be the actual depth to drill the fastener countersink hole. The depth output would account for the conducting foil depth and thickness, and the desired minimum distance between the conducting foil and the fastener head. This signal may be an electric signal to a display or to an automatic drilling machine. The signal could also be a visual or audible signal to the operator. For example, a series of yellow lights or LEDs could light to show the approximate depth when the conductive foil depth was larger than the first predetermined acceptable depth but less than the second predetermined acceptable depth. In another embodiment the actual depth may be displayed on a digital or analog meter.

When the detected depth of the conductive foil is larger than the second predetermined depth, then a change position signal can be output in block 540. This signal may also be an electric signal to a display or to an automatic drilling machine. The signal could also be a visual or audible signal to the operator. For example, a red light or LED could light when the conductive foil was too deep or the foil depth was larger than the second predetermined depth. Thereafter the process would return to block 510 to repeat the process for the new location.

Figure 6:
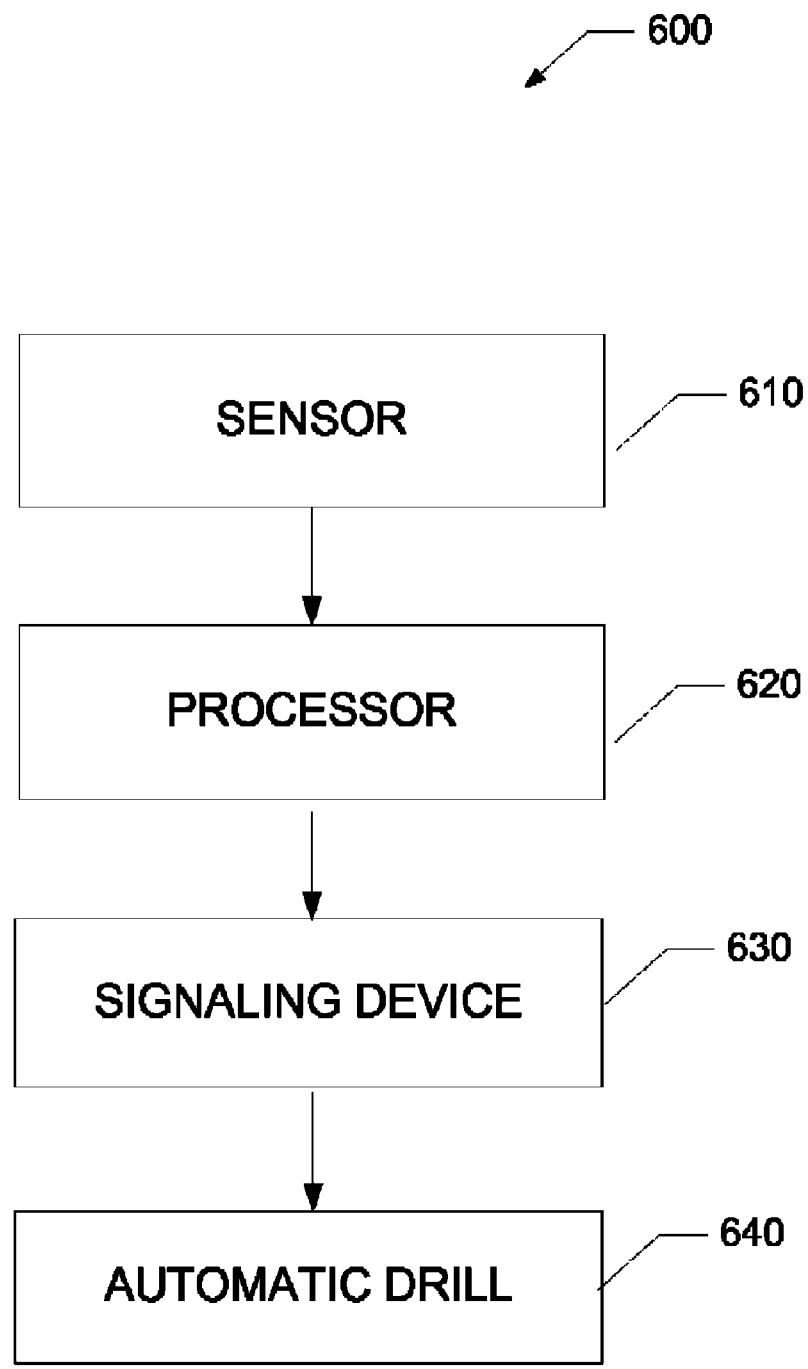
FIG. 6 illustrates an exemplary system diagram of a conductive foil depth detection and drilling system.

FIG. 6 illustrates a system that may use one of the processes disclosed above or may use process similar to those disclosed above to detect the depth of the conductive foil in a composite. Sensor 610 communicates with processor 620. The sensor 610 uses non-destructive testing methods to obtain a signal that is related to the depth of the conducting foil. The sensor 610 may have a single sensing element or a plurality of sensing elements. One example of a sensing element is an eddy current sensor.

Based on the signal received from sensor 610, the processor determines the depth of the conducting foil, determines if the depth of the standard countersink will provide a minimum distance between a fastener head and the conducting foil, or the countersink depth required to provide a minimum distance between a fastener head and the conducting foil.

The processor outputs the results of the sensor signal processing to signaling device 630. In some embodiments the signaling device 630 may be a display or an audio output. In some embodiments the signaling device 630 may send or transmit the processing results to an automatic drilling machine 640.

In one embodiment, the disclosed sensor may use an eddy current field in an eddy current sensing element to detect the depth of the wrinkles in fastener areas on a composite panel prior to drilling the fastener holes. The eddy current field is created by running an alternating current (at a selected frequency) through a coil (located in a sensing element) above the composite panel. As the distance between the coil and the conductive foil increases, the eddy current field strength decreases because less of the coil's magnetic field interacts with the metal in the conductive foil. This change in the eddy current will cause a change in the impedance of the coil. The impedance is then measured and correlated to the distance to the conductive foil (the depth of the wrinkle) using correlation curves and/or standards, allowing a direct reading of the depth of the conductive foil.

Figure 10:
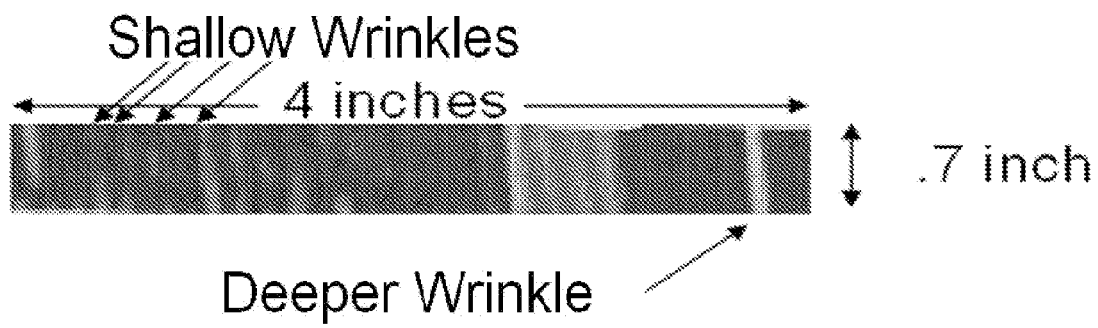
FIG. 10 is an exemplary screen capture of an image of conductive foil wrinkles that may be output to a display using one of the disclosed embodiments.

A test using an eddy current system and a portable X-Y scanner was conducted on a composite panel containing a copper LSP layer. The test produced a 2-D image of the foil wrinkles illustrated in FIG. 10. It was found that the copper foil can have many wrinkles and the primary variation is the depth of the wrinkle.

Figure 7:
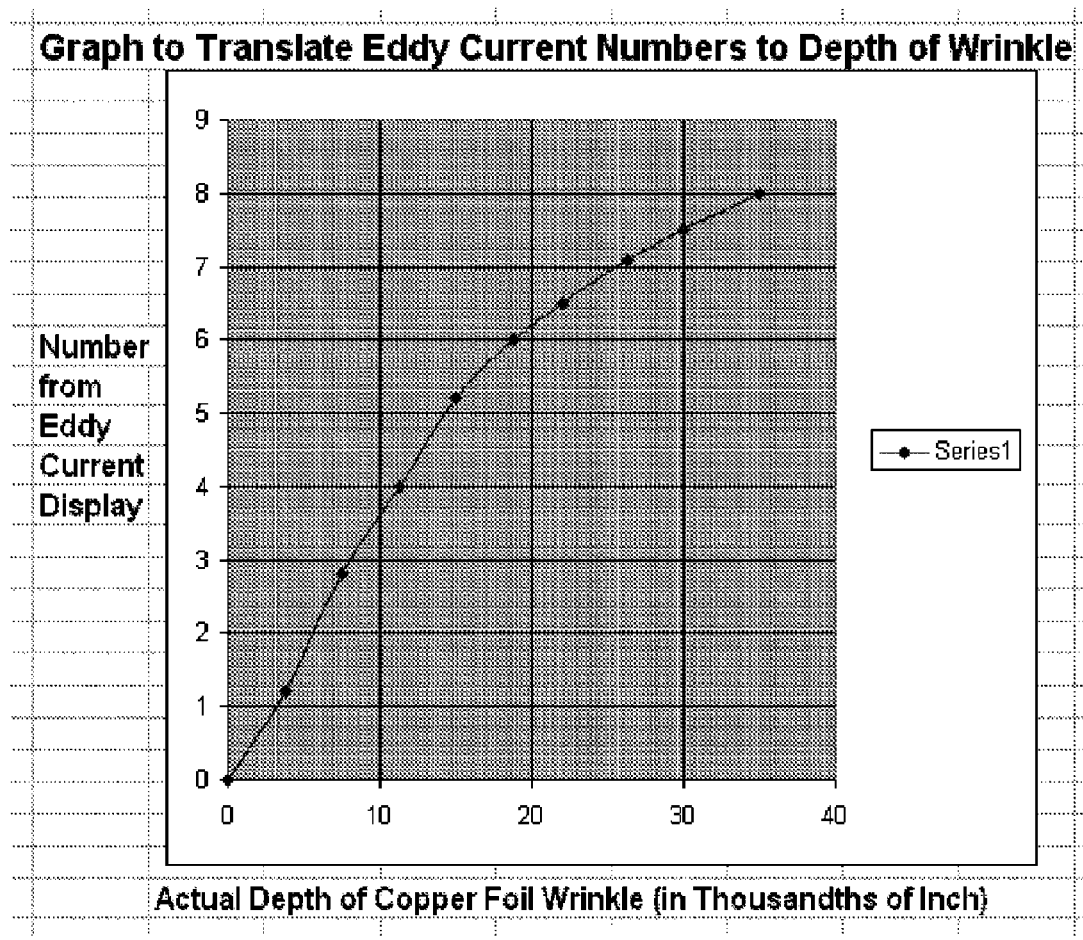
FIG. 7 provides an exemplary graph that shows one correlation between depth of wrinkles in a copper foil and a number from an eddy current display.

The eddy current signal at every location may be directly correlated to a depth using a calibration curve produced by scanning an inspection standard. FIG. 7 is an example of a typical calibration curve produced for one particular eddy current system and probe over a copper foil.

Figure 8:
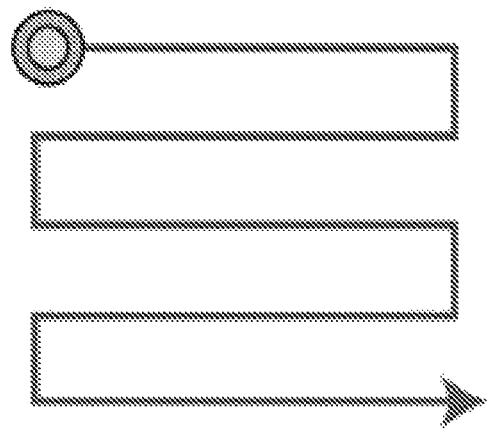
FIG. 8 illustrates an exemplary scan path that may be used with a sensor having a single sensing element.

The eddy current system having a sensor with a single sensing element would measure only a small-localized area in order to be able to measure the depth of wrinkles, which can be very narrow. This means that the integrated system with sensor, drill and fastener installation head above may require additional passes of the sensor to measure for wrinkles. In this embodiment it may be desirable to scan the sensor in a pattern such as the one shown in FIG. 8 in order to cover a larger area.

Figure 9:
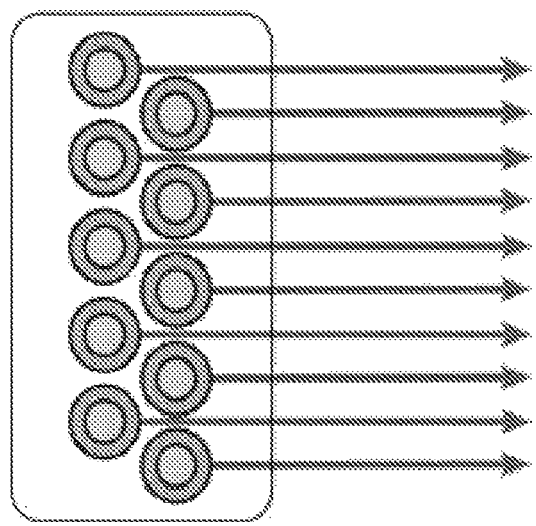
FIG. 9 illustrates an exemplary scan path that may be used with a sensor having a plurality of sensing elements.
Figure 11:
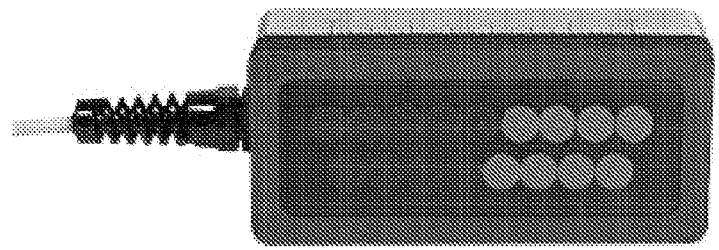
FIG. 11 shows one example of a sensor having a plurality of sensing elements.

In other embodiments, the sensor may use multiple sensing elements (e.g., eddy current coils) to allow rapid scanning of the fastener area. In sensing element arrays, the sensing elements are typically arranged in a pattern. One example of such a pattern is shown in FIG. 9. An example of an array probe is shown in FIG. 11.

The array probe could cover a much larger area with a single pass as compared to a probe with a single sensing element. The same area shown in FIG. 8 may be covered in a single pass as shown FIG. 9.

In one embodiment an eddy current array probe may be mounted to the automatic wing skin drilling and fastening system so the location of fasteners can be checked, and adjusted, on the fly. This allows the drilling and fastening system to operate at the high speeds necessary for cost effective manufacture of wing assemblies. The head on such a system would rotate into place first the array probe, then the drill, and finally the fastener installation head.

Figure 12:
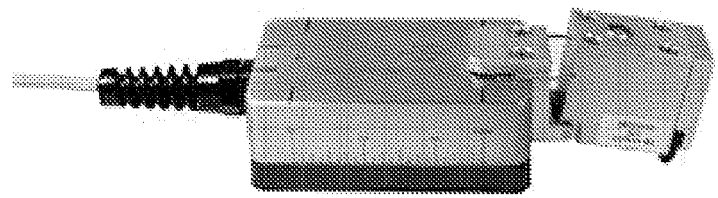
FIG. 12 illustrates one example of the sensor in FIG. 11 combined with a position encoder.

In other embodiments, scanning by hand with an array probe along the fastener line, prior to drilling and fastener installation, could inspect for wrinkles in the conductive foil. In one embodiment, an encoder could be attached to the eddy current array probe as shown FIG. 12. A computer with eddy current or other sensor type data imaging software, allowing correlation of the position data and the wrinkle's amplitude and width, could capture the data from the array and the encoder. The drilling and fastener installation could then be done by hand.

In summary, numerous benefits are described which result from employing the concepts of the invention. The foregoing description of exemplary embodiments is presented for the purposes of illustration and description, and is not intended to be exhaustive or to limit the embodiment to the precise form disclosed. Obvious modifications or variations are possible in light of the above teachings. The described embodiments were selected and described in order to best illustrate the principles disclosed and its practical application to thereby enable one of ordinary skill in the art to best utilize various embodiments and with various modifications as are suited to particular uses contemplated. It is intended that the scope of the disclosure be defined by the claims appended hereto.

We claim:
1. A method of drilling a fastener hole:
  a) scanning with a non-destructive depth detector over a prospective fastener hole location;
  b) detecting a depth of a conductive foil below a surface;
  c) when the detected depth is less than a predetermined depth, outputting a signal that indicates that a countersink fastener hole may be drilled; and
  d) when the detected depth is greater than a predetermined depth, outputting a signal that indicates that a countersink fastener hole may not be drilled.
2. The method of claim 1, further comprising:
  in response to the signal that indicates that the countersink fastener hole may not be drilled, moving the depth detector to a next alternate fastener hole location; and
  repeating steps a), b) and c) or d).
3. The method of claim 2, further comprising:
  in response to the signal that the countersink fastener hole may be drilled, drilling the fastener hole.
4. The method of claim 3, wherein the fastener hole is manually drilled.
5. The method of claim 3, wherein the fastener hole is automatically drilled with a drilling machine.
6. The method of claim 1, wherein
  c1) when the detected depth is less than a first predetermined depth, outputting a signal that indicates that a countersink fastener hole may be drilled to a first predetermined fastener depth;

d1) when the detected depth is greater than a second predetermined depth, outputting a signal that indicates that a countersink fastener hole may not be drilled,
wherein the first depth is less than the second depth, and
wherein the method further comprises:
e) when the detected depth is between the first and second predetermined depths, outputting a signal that indicates that the countersink may be drilled and that the countersink fastener hole depth should be greater than the first predetermined fastener depth.

7. The method of claim 6, further comprising:
in response to the signal that indicates that the countersink fastener hole may not be drilled, moving the depth detector to a next alternate fastener hole location; and
repeating steps a), b) and c1), d1) or e).

8. The method of claim 7, further comprising:
in response to the signal that the countersink fastener hole may be drilled, drilling the fastener hole.

9. The method of claim 8, wherein the fastener hole is manually drilled.

10. The method of claim 8, wherein the fastener hole is automatically drilled with a drilling machine.

11. The method of claim 6 wherein
e1) when the detected depth is between the first and second predetermined depths, outputting a signal that indicates that the countersink may be drilled and that the countersink fastener hole depth should be drilled to a second predetermined fastener depth, the second predetermined fastener depth is greater than the first predetermined fastener depth.

12. The method of claim 6 wherein
e2) when the detected depth is between the first and second predetermined depths, outputting a signal that indicates that the countersink may be drilled and a countersink depth to which the countersink fastener hole depth should be drilled, the countersink depth is greater than the first predetermined fastener depth.

13. A system for drilling countersink fastener holes in composites containing conductive foils, the system comprising: a sensor; a signaling device; and a processor, wherein the processor receives an output of the sensor, based on the received sensor output determines the depth of the conductive foil, outputs a first signal to the signaling device when the depth of the conductive foil is less than a first predetermined depth, and outputs a second signal to the signaling device when the depth of the conductive foil is greater than a second predetermined depth.

14. The system of claim 13, wherein the first and second predetermined depths are the same.

15. The system of claim 13, where in the signaling device is a display.

16. The system of claim 13, wherein the signaling device provides an audible output.

17. The system of claim 13, wherein the processor outputs a third signal to the signaling device when the depth of the conductive foil is greater than the first predetermined depth and less than the second predetermined depth.

18. The system of claim 13, further comprising:
an automatic drill receiving an output from the signaling device.

19. The system of claim 18, wherein the automatic drill drills a fastener hole countersink to a predetermined depth in response to receiving the first signal, and
wherein the automatic drill moves to a new position in response to the second signal.

20. The system of claim 19, wherein the processor outputs a third signal to the signaling device when the depth of the conductive foil is greater than the first predetermined depth and less than the second predetermined depth, and
wherein the automatic drill drills a fastener hole countersink to a second depth in response to receiving the third signal.

* * * * *